Oct. 9, 1934.  C. W. HOLLINGSWORTH  1,976,258
RADIUS ROD CUSHIONED BALL CONNECTION
Filed Sept. 5, 1933
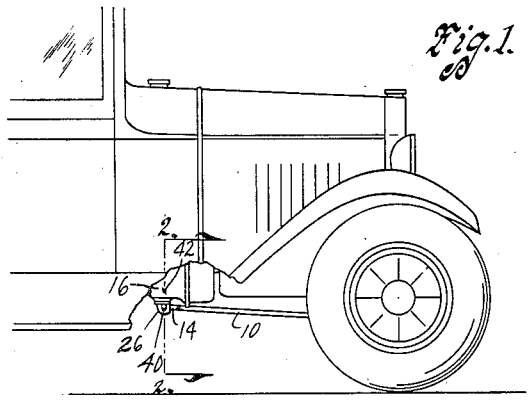
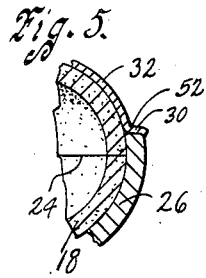
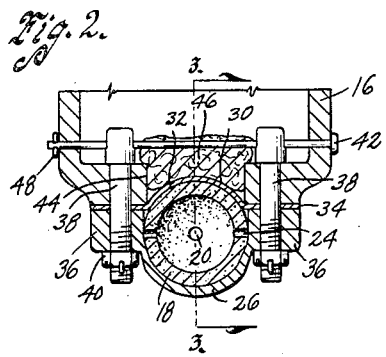
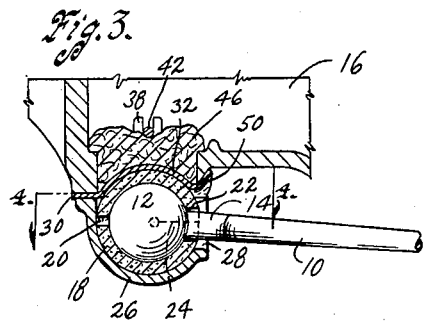
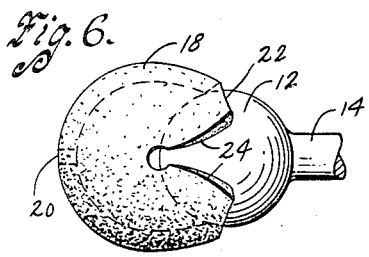
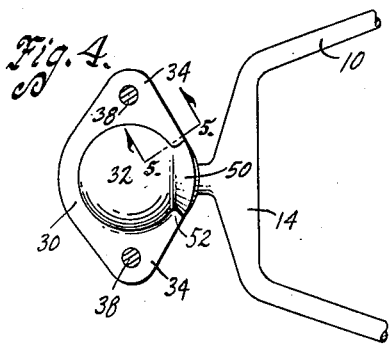
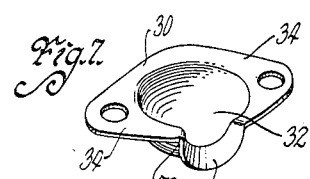
Inventor
Carl W. Hollingsworth
By Bair, Freeman & Sinclair
Attorneys
Witness
H. S. Munzenmaier Patented Oct. 9, 1934

1,976,258

UNITED STATES PATENT OFFICE 1,976,258

RADIUS ROD CUSHIONED BALL CONNECTION

Carl W. Hollingsworth, Marshalltown, Iowa

Application September 5, 1933, Serial No. 688,127

2 Claims. (Cl. 287—87)

This invention relates to the connection for the rear end of the radius rod employed on certain types of automobiles and the object is to provide a rubber cushioned connection between the ball on the radius rod and a socket carried by the fly wheel housing, for the purpose of insuring that the connection will always remain tight and snug and for insulating against shocks, preventing rattle and undue play of the parts, and thereby improving the operation of the vehicle.

A further object of the invention is to provide a special and improved construction for a rubber cushioning member employed in a ball and socket connection.

Still another object is to provide an improved form of ball cap or separable socket member designed particularly to receive the rubber cushioned ball of a radius rod and to hold the latter member in the desired cushioned relation and yet in the same position as intended by the designer of the vehicle.

Another object is to provide an improved ball cap or separable socket member for a rubber cushioned radius rod ball, said socket member being equipped with means for preventing the entrance of lubricating oil or grease to the interior of the socket or contact with the rubber cushioning member.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:—

Figure 1 is a side elevation of a portion of an automobile equipped with my improved radius rod cushioned ball connection, a portion of one fender and running board being broken away.

Figure 2 is an enlarged transverse vertical section through the cushioned ball connection on the line 2—2 of Figure 1.

Figure 3 is an enlarged longitudinal vertical section on the line 3—3 of Figure 2.

Figure 4 is a plan view, partly in section, on the line 4—4 of Figure 3.

Figure 5 is a detail section on the line 5—5 of Figure 4, showing particularly the means for deflecting oil and grease from the socket.

Figure 6 is an elevation illustrating the method of assembling the radius rod ball and the cushioning member.

Figure 7 is a perspective view of a covering plate.

There are certain types of motor vehicles, for example the Model A and AA Ford automobiles now on the market, which employ a so-called radius rod connection between the front axle and a fixed part of the vehicle. The radius rod 10 is of yoke form and is suitably connected at its forward end to the front axle, a spherical or ball head 12 being connected to the central part of the rear or closed end of the yoke by means of a neck or stem 14. The ball 12 provides part of a universal joint connection between the radius rod and a member such as the fly wheel housing 16. According to the factory construction the radius rod ball 12 has a direct metallic contact with a socket member mounted on the lower side of the housing 16.

My invention contemplates the substitution for the ordinary socket member of a special type of socket of larger capacity and capable of receiving a spherical cushioning member 18 mounted on the ball 12.

The cushioning ball 18 is preferably made of rubber or other suitable cushioning material and is of hollow formation. It is formed at its rear side with a small opening 20 and at its forward side with a considerably larger opening 22 through which the neck 14 of the radius rod ball may project. The cushioning ball is also formed with a number of slitted or slotted openings 24 through its walls, extending rearwardly from the margins of the front opening 22 on arcs of approximately ninety degrees. It is the function of the slitted openings 24 to permit an expansion of the forward end of the cushioning ball whereby to enlarge the front opening 22 and to permit the radius rod ball 12 to be inserted within the hollow cushioning ball 18, within which it fits snugly when so assembled.

When the cushioning ball 18 is mounted on the radius rod ball 12 it of course increases the effective diameter of the latter and for that reason it is necessary to provide an enlarged socket on the fly wheel housing 16, said socket being so shaped and arranged as to maintain the radius rod ball 12 in its normal position.

The socket includes an inverted cap member 26 preferably formed of malleable cast iron and having a relatively deep and substantially spherical socket within which the cushioning ball 18 fits, said member being formed with a forwardly directed substantially semi-circular opening 28 for the neck portion 14 of the radius rod.

Above the cap member 26 and cushioning ball 18 is mounted a covering plate 30 which is formed with a relatively shallow socket portion 32 supplementing the socket portion of the cap member and overlying the upper part of the cushioning ball 18.

The covering plate 30 overlies the inverted cap member 26 and is secured conjunctively therewith to the lower part of the fly wheel housing 16 in such manner that these members cooperate to form a socket for the radius rod ball 12 and its cushioning ball 18.

The covering plate 30 is formed at its lateral sides with projecting apertured ears 34 and the inverted cap member 26 is formed at its lateral sides with projecting apertured ears 36. The apertures of the ears 34 and 36 are in alignment and through these apertures are mounted the bolts 38 which are a part of the original equipment, said bolts being threaded at their lower ends and provided with nuts 40. The heads of the bolts 38 are bifurcated and are located within the housing 16. A pin 42, forming a part of the original equipment, is placed laterally through the lower part of the housing 16 and engages the bifurcations of the heads of the bolts 38. In this connection it should be noted that the fly wheel housing 16 is formed with an opening 44 in its bottom into which the socket portion 32 of the covering plate projects. In the opening 44 and above the socket portion 32 of the covering plate is placed a quantity of felt 46 which acts as a stopper for the opening 44 and prevents the passage of any considerable part of the lubricating oil or grease which may be contained in the housing. In assembling the parts the pin 42 is caused to pass through or immediately above the felt stopper member 46 for holding it in place, as shown in Figures 2 and 3, said pin 42 being provided with a head on one end and cotter key 48 at the other end.

The cover plate 30 preferably is formed of sheet metal in order that it may be made thinner than the member for which it is substituted, thus compensating for the greater thickness of the ball as caused by the addition of the cushioning member 18, and thereby assuring that the radius rod ball 12 will occupy its normal position in spite of the addition of the cushioning member.

The apertured ears 36 of the inverted cap member 26 are preferably embossed or considerably increased in vertical thickness in order that the bolts 38 forming a part of the original equipment may be employed for securing my substituted socket device, this increased thickness being desirable to compensate for the decreased thickness of the cover plate by forming it of sheet metal as above noted.

At its forward side the covering plate 30 is bent or turned upwardly to form an arcuate flaring lip 50 at the front of and communicating with the socket portion 32 and thereby cooperating with the opening 28 of the cap member 26 to provide clearance for the radius rod neck 14.

The upwardly and outwardly directed lip 50 also serves as a shield to catch any lubricating oil or grease which might seep from the housing 16 through the opening 44 and prevent it from entering the socket and contacting with the cushioning ball 18. At the opposite sides of the lip 50, the covering plate 26 is turned down slightly as indicated at 52 in Figs. 5 and 7, for the purpose of providing a means of escape for oil or grease coming upon the upper surface of said covering plate, the edge of which overlaps the socketed member 26 as clearly shown.

The provision of the cushioning member for the radius rod ball, together with the special socket device therefor, insures that the universal joint thus provided will always be tight and will not permit rattling of the parts even after the ball 12 may have become worn in use. This cushioning member also absorbs shocks due to vibration in travel or actuation of the steering apparatus, thus helping to reduce the amount of vibration that is transmitted to the vehicle body and other parts. It also prevents undue and undesirable play of certain parts of the vehicle, including the front axle, and helps to improve the steering qualities as well as the brake action applied to the front wheels.

It is important that the cover plate 30 be made of thin material such as sheet metal in order that the internal capacity of its socket portion 32 may be enlarged to accommodate the enlarged diameter of the cushioned ball head of the radius rod without at the same time enlarging its external diameter. This is for the reason that the socket portion 32 must fit into the hole or opening 44 of the fly wheel housing which serves to center and gauge the position of the socket connection. This formation of the cover plate also insures that the ball head of the radius rod will be placed in its normal position, or in other words— the position it was designed to occupy according to the original construction, in spite of the fact that its effective diameter is increased by the addition of the cushioning ball 18.

I claim as my invention:—

1. A radius rod ball cushion comprising a hollow ball-shaped radius rod enclosure member of resilient material having an opening for the portion of a radius rod extending from a radius rod ball, said member being split on diametrically opposite sides of said opening, from the opening and substantially half way around the member.

2. An oilless radius rod connection designed to replace a connection of the type having a socket in an engine part, a ball forming an end of the radius rod seated in the socket, a lower cap attached to the engine part and cooperating with the socket to hold the ball and a lubricant opening through the engine part communicating with the socket to lubricate the ball, comprising an upper cap adapted to fit the socket in the engine part and close the lubricant opening, an enclosure member of cushion material for surrounding the ball and adapted to be received between the upper cap and the lower cap and an upturned trough-like lip on the upper cap arranged to prevent lubricant which may flow from the opening in the socket from contacting and deteriorating the cushion material.

CARL W. HOLLINGSWORTH.